United States Patent [19]
Senior

[11] 3,950,562
[45] Apr. 13, 1976

[54] PROCESS AND APPARATUS FOR REMOVING ASH AND INORGANIC COMPOUNDS FROM CATTLE MANURE

[75] Inventor: Franklin C. Senior, Phoenix, Ariz.
[73] Assignee: Feed Recycling Co., Ripley, Calif.
[22] Filed: Nov. 30, 1973
[21] Appl. No.: 420,398

[52] U.S. Cl. .............. 426/431; 426/478; 426/489; 210/73 S; 210/74; 210/400; 71/12; 71/21
[51] Int. Cl.[2] A23K 1/20; A23K 1/28; B01D 37/00; C05F 3/00
[58] Field of Search ........................... 71/21, 12–15; 210/400, 401, 21; 426/212, 364, 479, 480, 495, 431, 478, 489

[56] References Cited
UNITED STATES PATENTS
| | | | |
|---|---|---|---|
| 970,711 | 9/1910 | Hoskins | 71/21 |
| 3,375,116 | 3/1968 | Anthony | 71/21 |

*Primary Examiner*—Charles N. Hart
*Assistant Examiner*—Ferris H. Lander
*Attorney, Agent, or Firm*—George J. Netter

[57] ABSTRACT

In reclaiming nutrients from manure, steps are taken to remove both insoluble and soluble ash components, thereby preventing their buildup to possibly dangerous levels when the reclaimed nutrients are used as recycled feed. After initial milling of the manure to a predetermined size, it is mixed with water or reflux brine to form a slurry. The manure-water slurry is released onto an inclined belt having a riffled surface moving in an upward direction while the slurry stream moves along a gravity path opposite the belt movement. The belt discharges ash at its upward side along with a small amount of fibers, feed mix, kernels, grains, and other organic matter. In this manner a major part of the undesirable inorganic, insoluble ash and a small amount of nutrient materials are removed from the manure. Alternatively, a centrifugal bowl classifier, an oscillating or pulsating jig screen, or preferably a shaking or concentrating table with riffles may be used.

5 Claims, 3 Drawing Figures

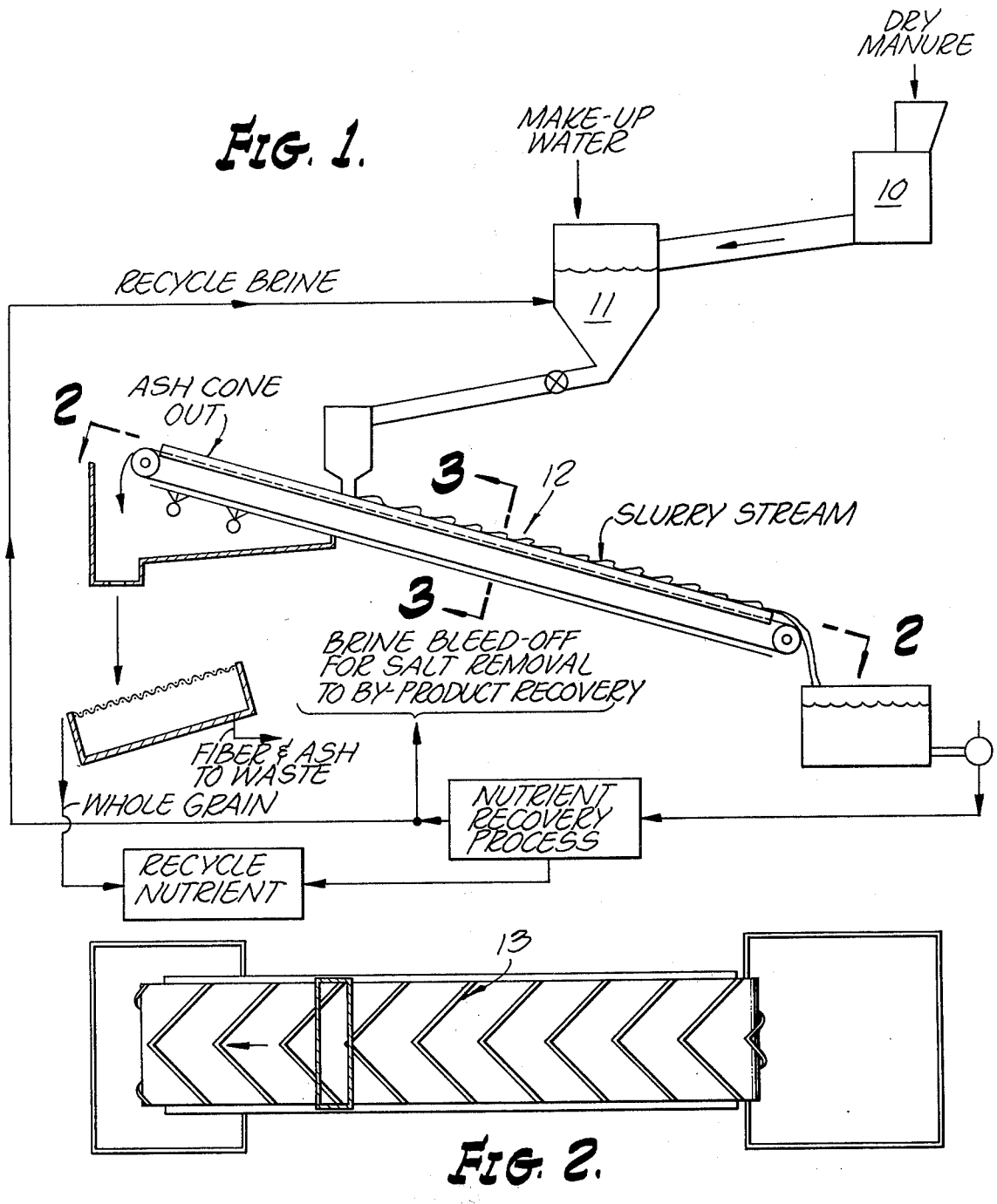
FIG. 1.
FIG. 2.
FIG. 3.

PROCESS AND APPARATUS FOR REMOVING ASH AND INORGANIC COMPOUNDS FROM CATTLE MANURE

The present invention relates generally to a process and apparatus for recovering nutrients from cattle manure, and, more particularly, to such a process and apparatus in which ash and other inorganic compounds are removed as a separate step during the recovery of nutrients.

BACKGROUND OF THE INVENTION

Conventional practice in raising cattle in most countries, is to confine them in feedlots or feedyards, where they are fed high-value feed mixes that are enriched with proteins, carbohydrates, fats, vitamins and minerals for the purpose of achieving a rapid gain in weight. Hundreds of such feedlots or feedyards exist in the United States alone, each one of which may contain as few as 2,000 or as many as 100,000 head of cattle, all confined in a relatively small area.

Studies establish that cattle are relatively poor in converting their food, and particularly high-value feed mixes, to useful meat and tissue, and, in fact, it has been shown that an average of 18 pounds (dry weight) of high-value feed mixes per day must be fed to a typical 700 pound animal for its maintenance and to achieve a daily weight increase in the range of 2½ to 2¾ pounds during its confinement in a feedyard. Where an average animal voids approximately 8–8.5 pounds by dry weight of manure and urine during a 24 hour period, it is clear that 30% to 40% by weight of the food value passes directly through and is present in its waste products.

In copending patent application Ser. No. 339,892, PROCESS FOR RECOVERING NUTRIENTS FROM ANIMAL WASTES by Franklin C. Senior, filed Mar. 9, 1973, there is described a method for recovering food values from manure, but which process does not remove certain so-called ash and other inorganic compounds normally present in the manure and which have no nutritional value. That is, since a considerable number of the feedlots at the present time have earthen floors, manure deposited thereon will automatically pick up a significant amount of inorganic salts, earthy oxides, and the like, as well as trace amounts of heavy metal oxides, sulfides, and minor amounts of compounds of lead, mercury, molybdenum, antimony and chromium. Since the recovered nutrients are contemplated primarily for recycled animal feed, it is clear that unless these various water soluble and water insoluble inorganic compounds (which will be referred to hereinafter generally as ash) are removed, they can build up to a level which might be dangerous to the health of the animals.

The ash components in new, i.e., unrecycled, feed are derived primarily from the plants and grains comprising the food mix and this can vary considerably from yard to yard with composition change being a function of the soil in which the food stock plants and grains are grown. Examinations of various feedlot mixes establish that on a dry basis, they are composed of 6%–7% ash. As a specific example, in a feedlot which averages approximately 18 pounds per day of dry weight feed for an animal of 650–700 pounds gross weight, there would be produced on an average about 8 pounds per day of dry weight manure as well as urine including a variety of different salts. The ash content in the daily ration of a feed mix consisting essentially of chlorides, sulfates and oxides of light and heavy metals, would be approximately 6.7% or 1.2 pounds. It has also been found that a large percentage of the ash compounds in the animal waste matter are soluble chlorides, sulfates and the like of sodium and potassium, for example, which may either remain in the animal or be voided in its urine or its manure. Therefore, from a practical standpoint, the dry or solid manure would carry about 8–10% ash or equivalent to approximately 0.60 pounds of the 8 pounds of dry manure, averaging out to approximately 10% of the dry manure. Substantial amounts of the original solids such as soluble salts in the urine leached or otherwise percolate into the earthen floor of the feedyard.

In the previous general example, the ash has been derived solely from the feed mix fed to the animal. However, when the manure has been deposited upon an earthen floor, analysis establishes that the dry manure always contains 27–32% ash. Therefore, for an average animal contained in an earthen floor feedlot, approximately 2.4 pounds per day of ash is present in its manure. This additional 2.4 pounds per day of insoluble ash that comes from the earthen floor is produced primarily by the animal pawing the manure and earth together, the wind blowing the dirt or the animal eating a certain amount of the soil mixed with his feed.

SUMMARY OF THE INVENTION

In the practice of the subject invention for reclaiming food valuables or nutrients from manure, techniques are adopted for removing both insoluble and soluble ash components, thereby preventing their buildup to possibly dangerous levels when the reclaimed nutrients are used as recycled feed. Specifically, after initial milling of the manure to a predetermined acceptable size, the manure is mixed with water or reflux brine to form a slurry. In one version, the manure-water slurry is released onto an inclined belt having a riffled surface moving in an upward direction and the slurry stream moves along a gravity path opposite the belt movement. The belt discharges, at its upward side, ash along with a small amount of fibers, feed mix, kernels, grains, and other organic matter. In this manner a major part of the undesirable inorganic, insoluble ash and a small amount of nutrient materials are removed from the manure.

Alternative means of removing the insoluble ash materials from the manure-water slurry are by using a centrifugal bowl classifier, an oscillating or pulsating jig screen, or preferably a shaking or concentrating table with riffles.

DESCRIPTION OF THE DRAWINGS

FIG. 1 depicts an operational flow diagram of the system of the subject invention for removing ash from a manure-water slurry attendant recovering nutrients therefrom; FIG. 2 is a plan view taken along 2—2 in FIG. 1; and FIG. 3 is a sectional elevational view taken along 3—3 of FIG. 2.

DESCRIPTION OF PREFERRED EMBODIMENTS

With reference now to the drawing, an initial 2,000 pound load of dry manure is seen to consist typically of approximately 500 pounds of insoluble ash, 100 pounds of soluble ash, and a remainder including the desired nutrients weighing 1,400 pounds. The entire batch of manure is first processed through a suitable mill 10, such as a hammer mill, where the manure is cut to a predetermined size, which size can vary somewhat depending upon the final form which the nutrient containing material is to take. Experience has shown that the average fiber length should not exceed about 3/16 of an inch for acceptance to cattle on recycled feeding.

Next, the properly milled manure is then transferred to a tank 11 where it is mixed with approximately 24,000 pounds make-up water to form a slurry. Optionally, recycled brine from the process may be used instead of fresh water. In a preferred form of the invention the slurry is deposited adjacent the upper end of an upwardly moving belt 12 arranged at a substantial slope with respect to the horizontal. The upper surface of the belt has a plurality of consecutively arranged V-shaped riffles or projections 13, the belt being adapted for movement in the direction of the arrow. Moreover, the moving belt is V-shaped in cross-section, with the lowest point being substantially at the center thereof, which serves to retain the slurry on the belt and prevent its spilling off the sides during transport (FIG. 3). Although some variation in slurry stream flow and belt orientation is permissible, best results to date have been obtained with the belt arranged at a slope of 1½ inch rise per 12 inch length, and a belt speed of 6 inches per minute whereby the slurry stream velocity down the belt is approximately 60 feet per minute. From an initial one ton of manure, typically, approximately 400 pounds of solid materials are dumped over the top of the moving belt, which, after screening, produces on an average approximately 80 pounds of whole grains and feed mix kernels, and 320 pounds of fibers and ash which can be thrown away. The 25,600 pounds of slurry which makes its way down the riffle belt, is then processed as disclosed in the copending application to recover nutrients for either direct recycled feeding or to be used as a nutrient additive to other feed mixes.

Alternatively, other separation techniques have also been found useful in removing ash from the manure-water slurry. For example, an oscillating concentrating table followed by a No. 10-mesh wire screen effectively passes the nutrient carrying slurry transversely while separating the insoluble ash components and grains. Similarly, acceptable results have been obtained using a centrifugal, solid-bowl classifier, as well as a pulsating screen jig.

Although the insoluble components of ash in manure obtained from earthen floor feedlots include a certain amount of ash inherent within the fibers themselves, the major proportion of such ash is that which is derived from the earth floor of the feedlot itself, and the subject invention is primarily concerned with the removal of this ash obtained from the soil of the feedyard floor.

The following table shows a typical composition of insoluble ash in manure and also indicates the relative contributions from the earth floor as compared to that inherent within the fiber itself:

TYPICAL INSOLUBLE ASH CONTENT OF 2,000 POUND SAMPLE OF MANURE

| | FROM FIBER | FROM SOIL | TOTAL ASH |
|---|---|---|---|
| $SiO_2$ | 51 | 148 | 199 |
| $Al_2O_3$ | | 82 | 82 |
| Mg and Ca oxides | 51 | 50 | 101 |
| Fe and Cr oxides | 17 | 17 | 34 |
| Other salts | 51 | 33 | 84 |
| | 170 lbs (34%) | 330 lbs (66%) | 500 lbs (100%) |

As is shown in the above table, approximately 56% of the total ash in the manure is composed of silica and alumina, 75% of the silica being contributed by the earth floor and the alumina being almost entirely obtained from the earth floor. Also, milling and forming a water slurry of the manure causes soluble sodium, calcium and potassium salts to be leached into the carrier slurry and thereby removed. A typical distribution of these soluble salts is as follows:

SOLUBLE ASH IN 2,000 POUNDS OF MANURE

| | |
|---|---|
| Potassium chloride (K Cl) | 55 lbs. |
| Sodium chloride (Na Cl) | 30 lbs. |
| Calcium and other salts | 10 lbs. |
| Phosphorous, sulfur and other trace materials | 5 lbs. |
| | 100 lbs. |

EXAMPLE 1

Two thousand (2,000) pounds of dry manure, shown by analysis to consist of approximately 100 pounds of potassium, sodium chloride and calcium salts, 500 pounds of inorganic metallic oxides and 1,400 pounds including the organic food values being reclaimed was fed into the mill 10 and converted into particle sizes not exceeding 3/16 of an inch. The properly sized materials were then added to 24,000 pounds of reflux recirculated brine solution carrying approximately 2% to 10% of salts and organics in true solution, the mixture being mixed in the tank 11 to form a slurry of manure.

320 pounds of inorganic and insoluble ash materials were removed by the use of a moving riffle belt as described earlier, with approximately 80 pounds of undigested whole grain kernels recovered screened out of the ash. The remaining 25,600 pounds of slurry was delivered to a processing system as described in the copending patent application for recovery of food valuables. In a final step of the nutrient recovery process (after addition of approximately 2,500 pounds of wash water), the 27,000 pounds of filtrate or centrate, including approximately 4% salts, ash and colloidal or soluble organics, was passed through a reverse osmosis or electro-dialysis unit, via which 100 pounds of potassium, calcium and sodium salts were recovered. The remaining brine solution was processed back to the slurry tank for reuse.

A portion (2500 pounds per hour) of brine solution was bled off and delivered to both a solar evaporation flat and a dryer unit for recovery of salts.

EXAMPLE 2

Another 2,000 pound sample of feedlot manure was initially adjusted to substantial zero moisture and milled in the mill 10 to a fine grain or fiber size.

The dust, fibers and the sandy or earthy components of the manure from the mill 10 were delivered through a curtain of fresh incoming water and recirculated brine to form a slurry in the tank 11 consisting of 10–14 parts water and brine to 1 part manure. Although fresh water may be used as indicated, it is preferable to use recirculated brine for maximum ash removal.

Modest agitation of the slurry in the tank 11 was initiated to effect thorough mixture after which slurry was released at a rate of approximately 350 pounds per minute (42 gallons per minute) onto 15-foot shaking tables with 0.25-inch riffles. The table in this case has its upper surface formed into a plurality of riffles, was 60 inches wide and sloped at a rate of 1 inch per foot. The riffles were ¼ inch deep and spaced longitudinally along the table at 2 inch intervals. The transverse velocity of the slurry across the table was maintained within the range of 30 to 90 feed per minute, with an oscillation rate of 250 strokes per minute.

At the end of 1 hour the table had discharged approximately 310 pounds by dry weight of inert silica and alumina from the heavy concentrate end of the table, along with 80 pounds of entrapped fibers, kernels, grains and other organic material. Discharge from the side of the table was delivered for further processing as described in the copending application.

The nutrient concentration was found to be increased by the removal of the insoluble ash components to the extent shown in the following table of solids and slurry:

|  | Manure Including Soluble and Insoluble Ash | Manure After Removal of Soluble and Insoluble Ash |
|---|---|---|
| Proteins | 17% | 22% |
| Fats | 4% | 5% |
| Sugars | 2% | 2% |
| Carbohydrates | 47% | 54% |
| Ash (Soluble and Insoluble) | 30% | 17% |
|  | 100% | 100% |

EXAMPLE 3

A 1,000 pound sample of manure-water slurry, produced in the same manner as that described in Example 2 was delivered to a pulsating jig having a 10-mesh wire screen with operation conducted at 120 strokes per minute.

From initial analysis of the manure, it was established that approximately 30 pounds of ash had been fed to the jig screen. After 4 minutes of operation 12 pounds (dry weight) of sand and clay and 3 pounds of fibers were collected, resulting in approximately 40% ash removal. This amounts to removing a major part of the casual insoluble ash obtained from the earth feedlot floor.

EXAMPLE 4

A further 1,000 pounds of manure slurry at 14% solids, mixed as in Example 2, was delivered to a centrifugal classifier which was operated at approximately 200 gravity. An ash content of 50% was obtained in the classifier bottom ring with approximately 8% protein in the 44 pounds of dried solids. The other two rings were found to include 96 pounds of solids, which on analysis showed 21% ash content.

The full composition breakdown is as follows:

| 1,000 pounds Incoming Slurry |  | In Bottom Ring | In Two Top Rings | In Centrate | Totals |
|---|---|---|---|---|---|
| 24 lbs. | protein | 2 lbs. | 7 lbs. | 15 lbs. |  |
| 7 lbs. | salt, sugars in solution | — | — | 7 lbs. |  |
| 42 lbs. | ash | 21 lbs. | 19 lbs. | 2 lbs. |  |
| 67 lbs. | insoluble fibers, fats | 21 lbs. | 43 lbs. | 3 lbs. |  |
| 860 lbs. | water | 40 lbs. | 76 lbs. | 744 lbs. |  |
| 1,000 lbs. | total | 84 lbs. | 145 lbs. | 771 lbs. |  |

| Distribution of Values |  |  |  |  |
|---|---|---|---|---|
| Ash | 50% | 45% | 5% | 100% |
| Protein | 8% | 30% | 62% | 100% |
| Salts | — | — | 100% | 100% |
| Fibers | 31% | 64% | 5% | 100% |

It is clear that on discarding the contents of the bottom ring or bowl, approximately 50 percent of the insoluble ash has been removed and 90 percent of the protein may be recovered.

In each of the recited examples of the subject invention the slurry stream remaining after ash removal was treated with a suitable precipitant or flocculant such as ferric chloride ($FeCl_3$), lime or a polyelectrolyte to recover nutrients and, specifically, proteins and proteinaceous materials. The liquid portion is then separated from the nutrient solids by gravity or in a centrifugal device and either discarded or recycled (RECYCLED BRINE) in the process. It is important to note that the techniques utilized herein for the removal of ash are fully compatible with the described nutrient recovery process which is more particularly set forth in the referenced copending application. That is, the subject invention does not in any way impede or necessitate the taking of additional processing steps in the recovery of dietary materials according to the process of the copending application. Not only is the pH of slurry substantially unchanged by ash removal procedures, but the time required for removing these undesirable inorganic materials is not such as to permit significant bacterial growth to take place.

As was noted earlier, in removing ash according to the preferred techniques disclosed herein with a continuous moving belt or concentrating table, whole grain kernels were also removed having substantial nutrient content. A significant enhancement in the process is obtained by screening or otherwise filtering out from the ash materials the whole grain components and adding these to the solid protein or nutrient cake obtained by screening, flocculation or precipitation. Where a pulsating screen or jig, or centrifugal bowl is used to separate out the ash materials, since these techniques would also pick up whole kernels, a separate screening or filtering would also be utilized to obtain the kernels for adding to the nutrient solids obtained.

Where brine is recycled in the process it is necessary to reduce the salt content in order to prevent salt accumulation through repeated recycling to unacceptably high levels. Accordingly, where the brine is recycled in the process, a portion of it is bled off and the salts removed in manner previously discussed and the salt-free water is then added back into the process. The salts obtained may be retained as by-products or disposed of, as desired.

What is claimed is:

1. A process for recovering nutrients from cattle manure which are substantially free of contaminants, comprising the steps of:
   mixing the manure with an aqueous solution to form a slurry;
   separating particulate matter including ash contaminants from the manure slurry;
   separating nutrients from the ash contaminants among the particulate matter;
   flocculating proteins from said manure-water mixture after the particulate matter is separated;
   removing soluble salts from at least a portion of the liquid remaining after flocculation; and
   recycling of the liquid remaining after flocculation including the salt-free portion in the process.

2. A process as in claim 1, in which the salts are removed from the liquid portion by evaporation.

3. A process for producing a nutritious feed material from cattle manure including ash components in particulate form, which comprises:
   forming an aqueous slurry of the manure consisting of one part dry manure to 6–14 parts of liquid;
   separating particulate material from the slurry;
   screening the particulate material to separate kernel nutrients from ash components;
   flocculating proteins from the manure slurry after the particulate matter is removed;
   mixing the flocculated proteins with the kernel nutrients to form the nutritious feed material; and
   recycling the liquid remaining after flocculation in the process.

4. A process as in claim 3, in which a portion of the liquid remaining after flocculation is bled off and evaporated to reclaim the dissolved salts.

5. In a process for recovering nutrients from a manure slurry having particulate matter including insoluble metal oxides and salts mixed therewith, a downwardly sloping continuous belt which is moving in an upward direction, said belt having an upper receiving surface, the improvement comprising the step of:
   depositing the manure slurry on the belt receiving surface at its upper end, whereby the particulate matter is separated from the slurry and moved off the upper end of the belt and the remaining slurry without the particulate matter moves along a gravity path off the lower end of the belt.

* * * * *